Sept. 5, 1933.  L. W. VAN BUSKIRK  1,925,420
DIPPER TOOTH
Filed Oct. 7, 1929
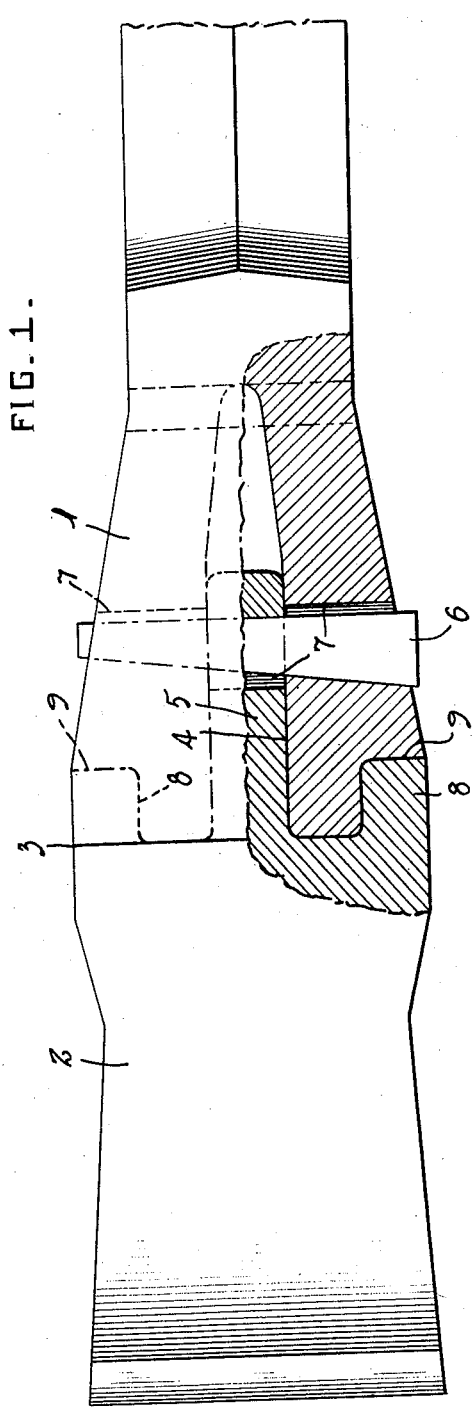
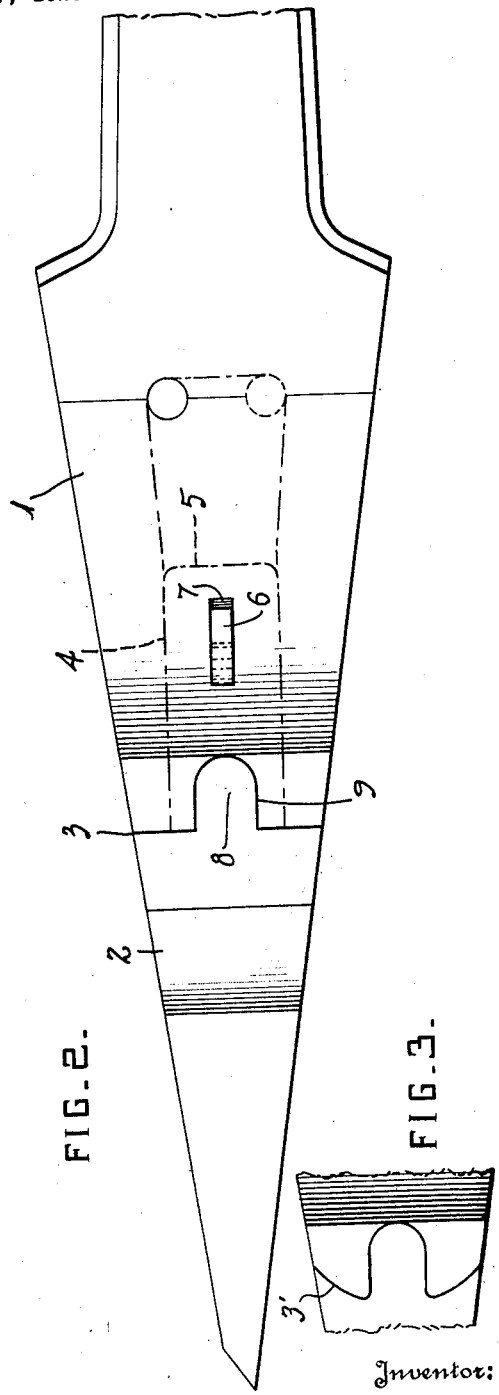
Inventor:
L. W. Van Buskirk
By Monroe E. Miller
Attorney.

Patented Sept. 5, 1933

1,925,420

UNITED STATES PATENT OFFICE 1,925,420

DIPPER TOOTH

Lesher W. Van Buskirk, Easton, Pa.

Application October 7, 1929. Serial No. 398,035

2 Claims. (Cl. 37—142)

The present invention relates to the teeth of excavating dippers, and aims to provide a novel and improved dipper tooth.

With the usual long sharp pointed tooth the wear thereof must be taken care of by forging out the dulled point or by supplying a new tooth, with the prevailing types of teeth of this kind.

A tooth of the long, sharp, pointed type is desirable, especially under some conditions, but is objectionable due to the rapid dulling of the point, and a tooth of that type with a renewable tip would be especially advantageous. For this long, narrow, sharp type of tooth the known types of removable tips do not lend themselves to the contour of the tooth, and the problem presented is to provide a tooth having a shank and a tip with a novel joint between them that will withstand the severe stresses and strains to which the tooth is subjected in use.

In carrying out the invention it has been found advantageous to provide square abutments between the shank and tip, that is, abutting surfaces which are disposed at substantially right angles to the axis of the tooth, so that compression forces are taken up without a weakening effect, and means being provided for holding the tip tightly against the shank and for preventing relative lateral or rotary replacement of the tip with respect to the shank.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a plan view of the improved dipper tooth, portions being broken away and shown in section.

Fig. 2 is a side elevation of the tooth.

Fig. 3 is a fragmentary side elevation illustrating a modification.

The tooth, as shown, is of the long, narrow, pointed type, which is especially suitable for some purposes, and the tooth is divided at a distance from the point, and comprises the shank 1 and tip 2. Said shank and tip have a square abutment 3, the abutting ends of the shank and tip being in planes substantially at right angles to the axis of the tooth, so that compression forces are effectively transmitted from the tip to the shank without a weakening effect.

Suitable means are provided for securing the tip against the shank. As shown, the shank has a socket 4 in the forward end portion thereof, and the base end of the tip has an extension or stem 5 slipped snugly into said socket. A wedge 6 is driven through registering openings 7 in the shank 1 and extension 5 to draw the tip tightly against the shank, thereby anchoring the tip securely to said shank.

The tip is provided at opposite sides or at any other suitable points with lugs 8 projecting therefrom and fitting snugly in recesses or pockets 9 with which the forward end of the shank is provided, whereby such interfitting portions of the tip and shank will resist the shearing and torsional strains between the tip and shank, as well as the bending forces.

The shank of the tooth is secured to the dipper in any suitable manner, and the tip 2 is removable, for forging or replacement when the tip becomes dull. By the provision of the joint between the tip and shank the tooth is practically of unbroken strength throughout its length, notwithstanding the use of the removable tip on the slender type of tooth. The lugs 8 and pockets 9 are preferably at the sides of the tooth but may be arranged otherwise, and reduce to a minimum the tendency for the tip to be displaced with reference to the shank at the juncture thereof due to the various stresses and strains to which the tooth is subjected in use.

As seen in Fig. 1, the tooth is made wider at the joint between the shank and tip, so as to provide added strength. As will be noted, the tip 2 and shank 1 have outwardly flared side portions which produce the widened tooth construction. The widened portion forms the square abutment 3, as has been previously commented upon, and serves, in addition to providing added strength, to protect the wedge 6 in either deflecting material away from it or in providing a location for the member in a protected place.

As seen in Fig. 3 the abutment 3' between the shank and tip is not square, the end of the shank being convexed and the base of the tip concaved. It is thus possible to deviate slightly from a strictly square abutment, although the square abutment is preferred.

Having thus described the invention, what is claimed as new is:

1. A dipper tooth comprising a shank wedge-shaped as viewed in side elevation and a detachable wedge-shaped tip, the latter having its top and bottom wedging surfaces forming continuations of the corresponding surfaces of said shank, said shank and tip having a square abutment between them, means for drawing said tip and shank together, the shank having a pocket at each side opening toward the tip and arranged between the wedging top and bottom surfaces of the tooth, side lugs carried by the tip and fitting in said pockets to prevent relative displacement between the tip and shank, and said shank and tip widened by outward flaring of each side beginning at points lineally removed from said pockets and the side lugs respectively whereby to provide supporting stock for the same.

2. A dipper tooth comprising a shank wedge-shaped as viewed in side elevation and a detachable wedge-shaped tip, the latter having its top and bottom wedging surfaces forming continuations of the corresponding surfaces of said shank, said shank and tip having a square abutment between them, means for drawing said tip and shank together, the shank having a pocket at each side opening toward the tip and arranged between the wedging top and bottom surfaces of the tooth, side lugs carried by the tip and fitting in said pockets to prevent relative displacement between the tip and shank, and said shank and tip being widened by outward flaring of each side beginning at points lineally removed from said pockets and the side lugs respectively whereby to provide supporting stock for the same, the means for drawing said tip and shank together being insertable from one side of the shank through the flared portion thereof rearwardly of said pockets.

LESHER W. VAN BUSKIRK.